US011892885B2

(12) United States Patent
Choi et al.

(10) Patent No.: US 11,892,885 B2
(45) Date of Patent: Feb. 6, 2024

(54) INFORMATION HANDLING SYSTEM HOUSING WITH INTEGRATED PLANAR SPEAKER

(71) Applicant: Dell Products L.P., Round Rock, TX (US)

(72) Inventors: Duck-Soo Choi, Georgetown, TX (US); Peng Lip Goh, Singapore (SG); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 39 days.

(21) Appl. No.: 17/372,752

(22) Filed: Jul. 12, 2021

(65) Prior Publication Data

US 2023/0011184 A1 Jan. 12, 2023

(51) Int. Cl.
*G06F 1/16* (2006.01)
*H04R 1/02* (2006.01)
*H04R 9/02* (2006.01)

(52) U.S. Cl.
CPC .......... *G06F 1/1688* (2013.01); *H04R 1/028* (2013.01); *H04R 9/025* (2013.01); *H04R 2499/15* (2013.01)

(58) Field of Classification Search
CPC ....... G06F 1/1688; H04R 1/028; H04R 9/025; H04R 2499/15; H04R 7/045; H04R 9/045; H04R 9/066; H04R 1/021; H04R 1/025; H04R 1/24; H04R 1/26; H04R 3/04; H04R 5/02; H04R 7/06; H04R 17/00; H04R 2499/13
See application file for complete search history.

(56) References Cited

U.S. PATENT DOCUMENTS

| 2005/0069159 A1* | 3/2005 | Nakazato | H04R 5/02 381/388 |
| 2006/0022957 A1* | 2/2006 | Lee | G06F 3/03547 345/173 |
| 2013/0156237 A1* | 6/2013 | Kim | H04R 9/045 381/191 |

(Continued)

OTHER PUBLICATIONS

Laptop Mag, "HP Envy 14 Spectre Hands-on: First Glass Ultrabook," downloaded from https://www.laptopmag.com/articles/hp-envy-14-spectre-hands-on-first-glass-ultrabook-coming-february-8th-for-1399 on Jul. 15, 2021, 11 pages.

(Continued)

*Primary Examiner* — Carolyn R Edwards
*Assistant Examiner* — Julie X Dang
(74) *Attorney, Agent, or Firm* — ZAGORIN CAVE LLP; Robert W. Holland (57) ABSTRACT

A portable information handling system glass ceramic housing has a cut out section at an opening and a speaker chamber cover disposed in the opening to integrate a speaker at a bottom front side of the housing. A speaker coil couples to the housing section to align with a speaker magnet coupled to the speaker chamber cover to generate audible sound in a speaker chamber defined when the housing section couples over the opening. A polymer material is disposed between the housing section and housing, and the housing section is cut out with an upward curve, so that audible sound is directed upwards from the housing and towards an end user of the information handling system.

20 Claims, 8 Drawing Sheets

(56) References Cited

U.S. PATENT DOCUMENTS

| | | | | |
|---|---|---|---|---|
| 2013/0243237 A1* | 9/2013 | Zhao | ............... | H04R 1/2888 381/386 |
| 2014/0145836 A1* | 5/2014 | Tossavainen | ............ | H04R 7/04 340/407.2 |
| 2018/0184185 A1* | 6/2018 | Ent | ..................... | H04R 1/025 |

OTHER PUBLICATIONS

Nokia, "5G Gaming," downloaded from https://www.nokia.com/networks/5g/gaming/ on Feb. 15, 2021, 5 pages.

Telia Company, "5G for Esports Tested," downloaded from https://www.teliacompany.com/en/news/news-articles/2018/5g-speeds-for-esports-tested/ on Jul. 15, 2021, 3 pages.

Corning, "Glass is Better for Wireless Charging," downloaded from https://www.corning.com/gorillaglass/worldwide/en/glass-is-better-for-wireless-charging.html on Jul. 15, 2021, 3 pages.

Nokia, "Smart Node Femtocells," downloaded from https://www.nokia.com/networks/solutions/femtocells/ on Jul. 15, 2021, 4 pages.

Researchgate, "60 GHz dipole antenna for short range indoor communication systems," downloaded from https://www.researchgate.net/publication/261233540_60_GHz_dipole_antenna_for_short_range_indoor_communication_systems on Jul. 15, 2021, 2 pages.

Lenovo, "Laptop Docking Stations," downloaded from https://www.lenovo.com/us/en/accessories-and-monitors/docking/dc/docking . . . on Jul. 15, 2021, 6 pages.

CNET, "HP Advanced Wireless Docking Station—wireless docking station—VGA, 2 x DP-802.11ad (WiGig) Specs & Prices," downloaded from https://www.cnet.com/products/hp-advanced-wireless-docking-station-wireless-docking-station-vga-2-x-dp/ on Jul. 15, 2021, 6 pages.

PNAS, "High thermal conductivity in soft elastomers with elongated liquid metal inclusions," downloaded from https://www.pnas.org/content/114/9/2143 on Jul. 15, 2021, 27 pages.

Arieca, "Modern Materials for a Connected Society," downloaded from arieca.com, 7 pages.

Figshare, "Stretchable Graphene Thermistor with Tunable Thermal Index," downloaded from https://figshare.com/articles/journal_contribution/Stretchable_Graphene_Thermistor_with_Tunable_Thermal_Index/2193646 on Jul. 15, 2021, 7 pages.

Semantic Scholar, "Stretchable Graphene Thermistor with Tunable Thermal Index," downloaded from https://www.semanticscholar.org/paper/Stretchable-graphene-thermistor-with-tunable-index.-Yan-Wang/1d03bb564b4713a2b69a42f31a0ae6f1d5cf2bff on Jul. 15, 2021, 4 pages.

The Verge, The Lg G8 has a vibrating OLED screen for a speaker, downloaded from https://www.theverge.com/2019/2/13/18224394/lg-g8-thinq-oled-speaker-quad-dac-boombox on Jul. 15, 2021, 2 pages.

* cited by examiner

INFORMATION HANDLING SYSTEM HOUSING WITH INTEGRATED PLANAR SPEAKER

BACKGROUND OF THE INVENTION

Field of the Invention

The present invention relates in general to the field of portable information handling systems, and more particularly to an information handling system housing with an integrated planar speaker.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

Generally, end users prefer portable information handling systems with a minimal footprint and weight, which has driven manufacturers to provide a given processing capability in as minimalist of a housing as possible. Typically, an end user selects a display size, which drives the housing width and length, and then selects a particular information handling that meets a desired performance level and housing thickness, also known as Z-height. Generally, as housing thickness decreases thermal constraints limit processing component performance due to less efficient rejection of excess thermal energy. Reduced housing thickness also increases the difficulty of including high performance components due to the reduced housing interior. For example, portable information handling systems often include a variety of wireless devices and antennae; where housing size is minimal, less room is available to deploy the antennae, which can increase wireless interference and hurt wireless signal transmission and reception. As another example, portable information handling systems are often used to present multimedia information, such as movies and music; where housing size is minimal, insufficient room exists to integrate a high quality speaker, particularly in lower audio tones that tend to need larger speaker volumes for high quality sound.

Another difficulty with low profile portable information handling systems is that thinner housings tend to be less robust and more susceptible to failure. Typically, portable housings are tested by repeated cycles of usage, such as repeated opening and closing of housing portions. To reduce housing thickness and weight, some manufacturers have moved towards more exotic materials, such as ceramics. One example of a material that offers aesthetically-pleasing and robust qualities is a glass ceramic material. Glass ceramic material has gained acceptance as a hardened clear cover placed over a display, especially in portable tablet and phone devices that are susceptible to dropping and breaking. One commercial product is Gorilla Glass by Corning, which provides a hardened transparent material that resists breakage. Glass ceramics offer advantages as a housing material in addition to use as a glass cover, although glass ceramics do not conduct or current heat very readily, which can introduce difficulties with thermal management, wireless signal management and other system functions.

SUMMARY OF THE INVENTION

Therefore, a need has arisen for a system and method which integrates a speaker with an information handling system housing by leveraging a section of the housing as the speaker diaphragm.

In accordance with the present invention, a system and method are provided which substantially reduce the disadvantages and problems associated with previous methods and systems for integrating a speaker into an information handling system housing. A bottom front section of a housing separate from the housing defines a speaker chamber that encloses audio elements within the housing so that application of audio signals to the audio elements generates audible sound by leveraging the front section of the housing as a speaker diaphragm. In one embodiment, the housing and housing section are formed from a glass composite and coupled with a polymer gasket to support diaphragm vibration.

More specifically, a portable information handling system processes information with processing components disposed in portable housing, such as a processor and memory that generate audio information playable as audio signals sent from an audio chipset to an audio element disposed in a speaker chamber defined within the portable housing. In one example embodiment, a main housing is formed from a glass ceramic and a speaker section is cut out at a front lower surface and sealed in place by a gasket of a flexible polymer material. A speaker chamber cover fits in the main housing over the housing section to define a speaker chamber. The housing speaker section is a substantial part of the front width of the housing to define a planar speaker chamber with a curved portion at the housing front face to direct audio energy upwards from the main housing. For instance, the speaker housing section is greater than 50% of the front width of the main housing, such as 80% or more of the housing width. The audio element includes an audio coil that couples to the speaker housing section with an optically clear adhesive and an audio magnet that couples to the speaker chamber cover. Sounds generated by the audio signal passing through the audio coil in proximity to the audio magnet generate audible vibrations amplified within the sound chamber and directed out the front curved surface upwards towards an end user of the information handling system.

The present invention provides a number of important technical advantages. One example of an important technical advantage is that a planar speaker chamber defined to use a section of the system housing as a diaphragm generates high quality sound with minimal housing height. The speaker chamber is extended along a front side of the housing to provide a substantial speaker chamber volume and a substantial part of the width of the housing to deploy a speaker coil and magnet. Hardened glass housing material, such as ceramic glass, provides a robust and firm surface to define the speaker diaphragm. The high quality sound is provided with minimal invasiveness as the speaker chamber blends into the main housing structure.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A portable information handling system housing section defines a speaker chamber as the speaker diaphragm to generate audible noise. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
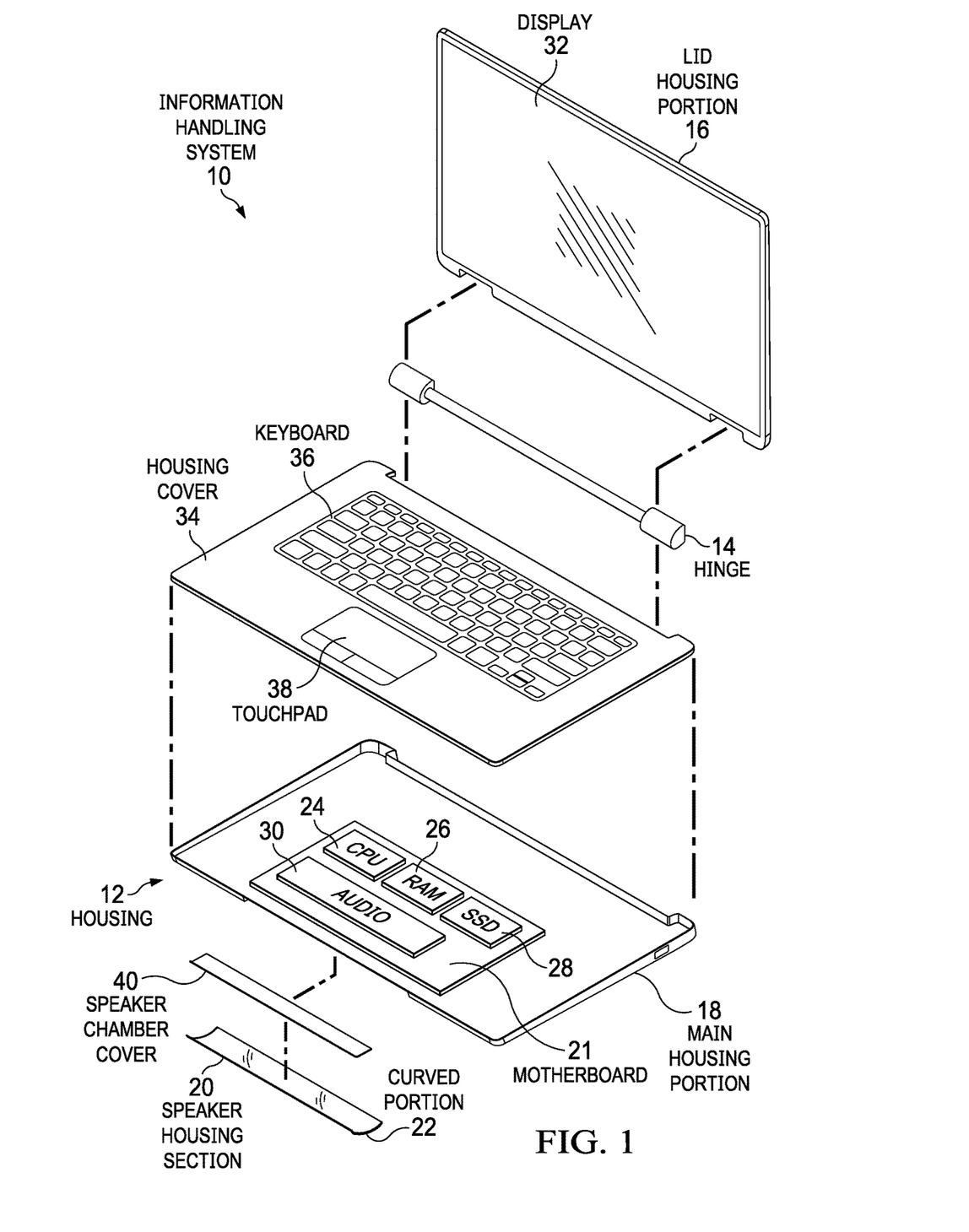
FIG. 1 depicts an exploded perspective view of a portable information handling system having a speaker chamber defined by a cut out section of the portable housing.

Referring now to FIG. 1, an exploded perspective view depicts a portable information handling system 10 having a speaker chamber defined by a cut out section 20 of the portable housing 12. In the example embodiment, information handling system 10 is built in a housing 12 having a main housing portion 18 rotationally coupled to a lid housing portion 16 by a hinge 14 to have a convertible configuration that translates between closed and open positions. Alternative embodiments may include tablet information handling systems having a planar housing or other types of housing arrangements. Speaker housing section 20 is cut from a bottom front side of main housing portion 18 so that a curved portion 22 acts to redirect sound generated within speaker housing section 20 upwards and towards an end user as described in greater detail below. Main housing portion 18 houses processing components that cooperate to process information. For instance, a motherboard 21 coupled to main housing portion 18 interfaces a central processing unit (CPU) 24 that executes instructions to process information with a random access memory (RAM) 26 that stores the instructions and information. A solid state drive (SSD) 28 or other persistent storage device stores the information and instructions during power down periods, such as an operating system and applications that execute on CPU 24 to generate audio and visual information. An audio chipset 30 receives audio information from CPU 24 to generate audio signals that create audible sounds at a speaker. A display 32 integrates in lid housing portion 16 to present visual information as visual images, such as after a graphics processor further processes information of CPU 24 to define pixel values. A housing cover 34 couples over main housing portion 18 to support a keyboard 36 and touchpad 38 that accept end user inputs.

In the example embodiment, enhanced audio capability is provided for a low profile housing of minimal Z-height by defining a speaker chamber between speaker housing section 20 and a speaker chamber cover 40 coupled within main housing portion 18. The volume of the speaker chamber is enhanced by having a width for speaker housing section 20 that includes approximately 80% of the width of main housing portion 18, although alternative embodiments may have less width, such as 50% or greater of main housing portion width, or greater width that runs from end to end of main housing portion 18. Speaker housing section 20 acts as a speaker diaphragm by translating vibrations of audible energy generated under speaker chamber cover 40 to external housing 12. In the example embodiment, main housing portion 18 is formed with a glass ceramic material, such as Gorilla Glass available from Corning, and speaker housing section 20 is cut out as a separate section. In alternative embodiments, main housing portion 18 and speaker housing section 20 may be formed as separate pieces rather than machined from one piece. Glass ceramic material provides a hardened transparent glass with a polycrystalline structure produced by controlled crystallization of base glass to adapt properties of both glass and ceramic. In alternative embodiments, other housing materials may be used to include ceramic materials and glass materials, as well as metal materials, where the speaker housing section 20 is coupled loosely to main housing portion 18 to translate audio vibrations created within the speaker chamber defined between speaker housing section 20 and speaker chamber cover 40. As described below, various configurations of sizes and materials may be selected with some experimentation to optimize sound creation.

Figure 2:
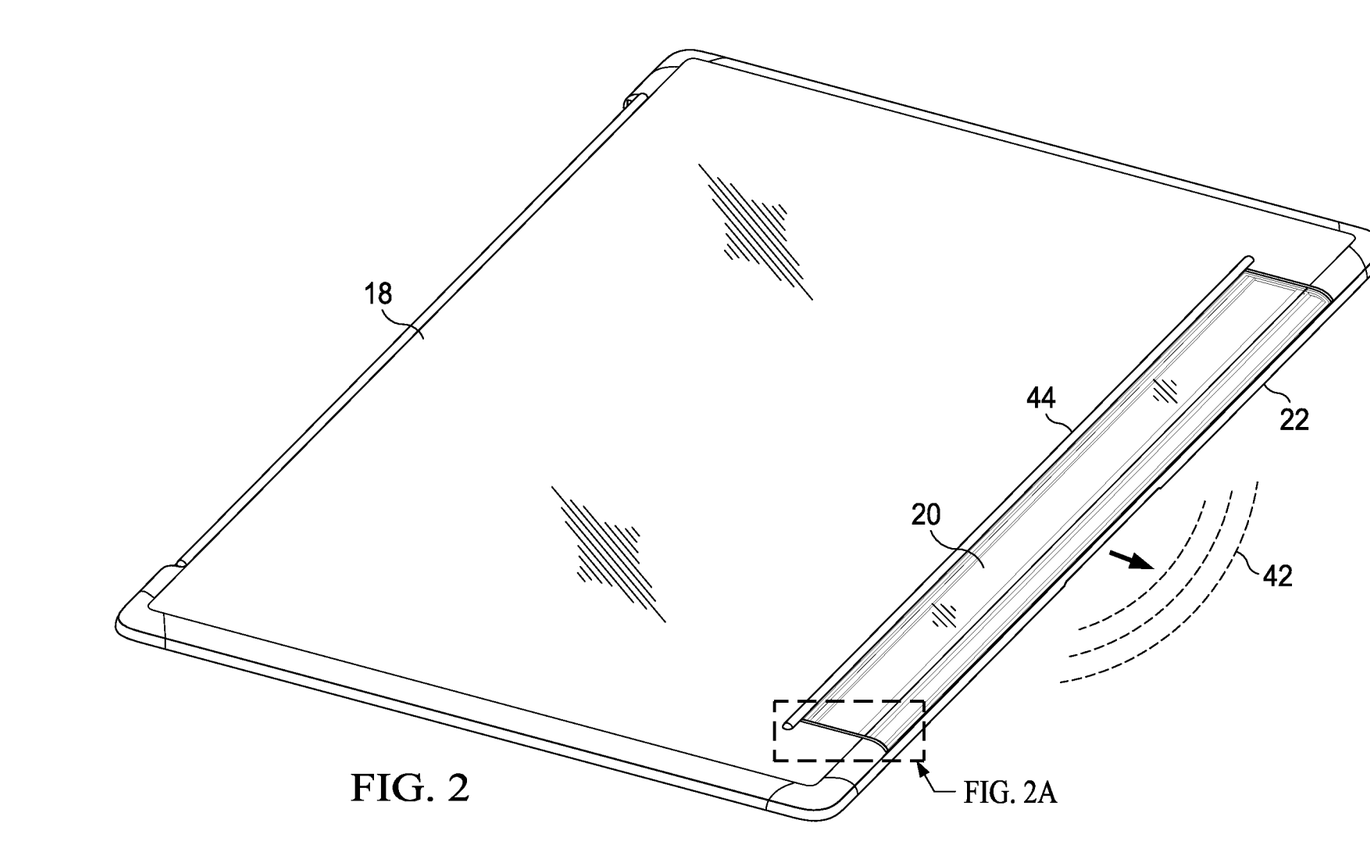
FIGS. 2, 2A and 2B depict a bottom view of the main housing portion and speaker housing section to illustrate one example of an integrated speaker defined by an information handling system housing.
Figure 2A:
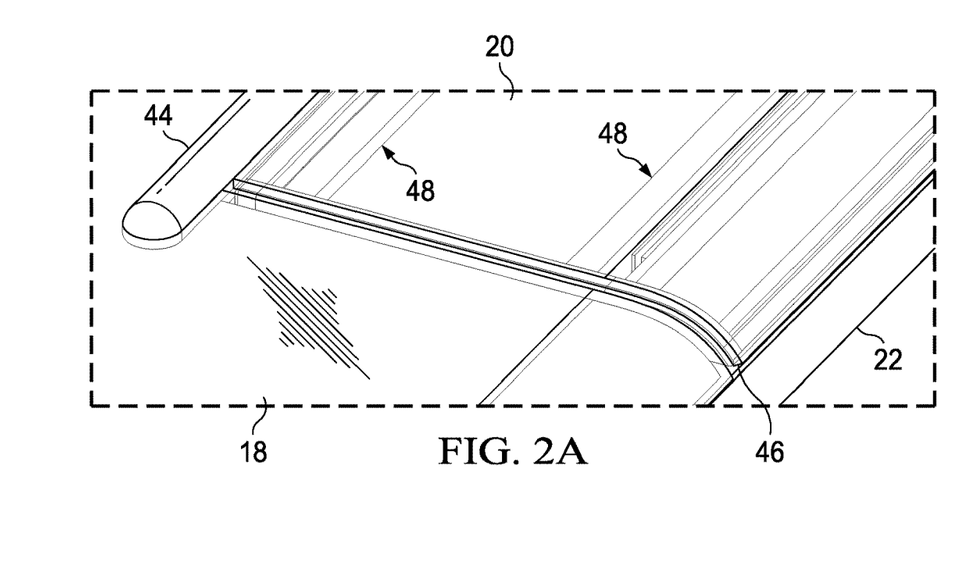
Figure 2B:
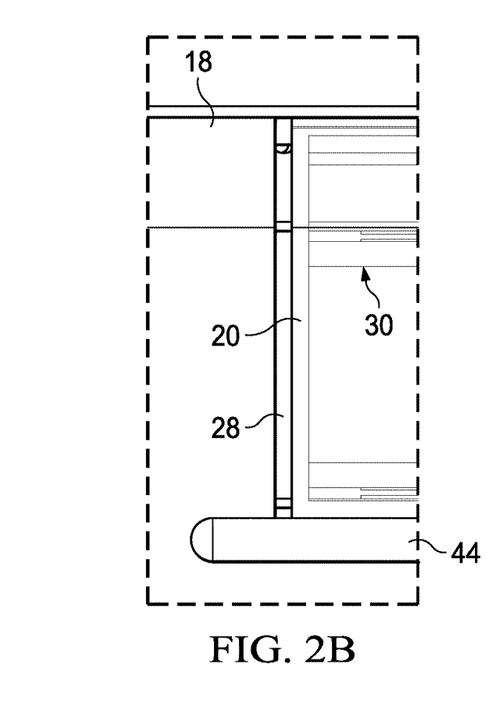

Referring now to FIGS. 2, 2A and 2B, a bottom view of main housing portion 18 and speaker housing section 20 illustrate one example of an integrated speaker defined by an information handling system housing. FIG. 2 depicts a bottom perspective view of main housing portion 18 having speaker housing section 20 coupled in place to project sound up curved portion 22 as indicated by arrow 42. In the example embodiment, speaker housing section 20 has substantially 80% of the width of the bottom front side of main housing portion 18 with a foot 44 coupled to main housing portion 18 along the inner width of speaker housing section 20. The location of foot 44 helps to cosmetically hide the seam between main housing portion 18 and speaker housing section 20, and also spaces the bottom surface of speaker housing section 20 away from a support surface to aid in translation of audio vibration. FIG. 2A depicts a close-up view of an intersection of main housing portion 18 and speaker housing section 20 where an elastic polymer material 46 is disposed to support vibration of speaker housing portion 20 in its function as a speaker diaphragm, such as an elastomer or mylar gasket disposed around the perimeter of speaker housing section 20. An audio element 48 is depicted through a transparent view of speaker housing section 20, which generates audible sounds as described below. FIG. 2B depicts a bottom view of the intersection of main housing portion 18 and speaker housing section 20 where the elastic polymer material 46 is depicted as filling a 0.8 mm gap.

Figure 3:
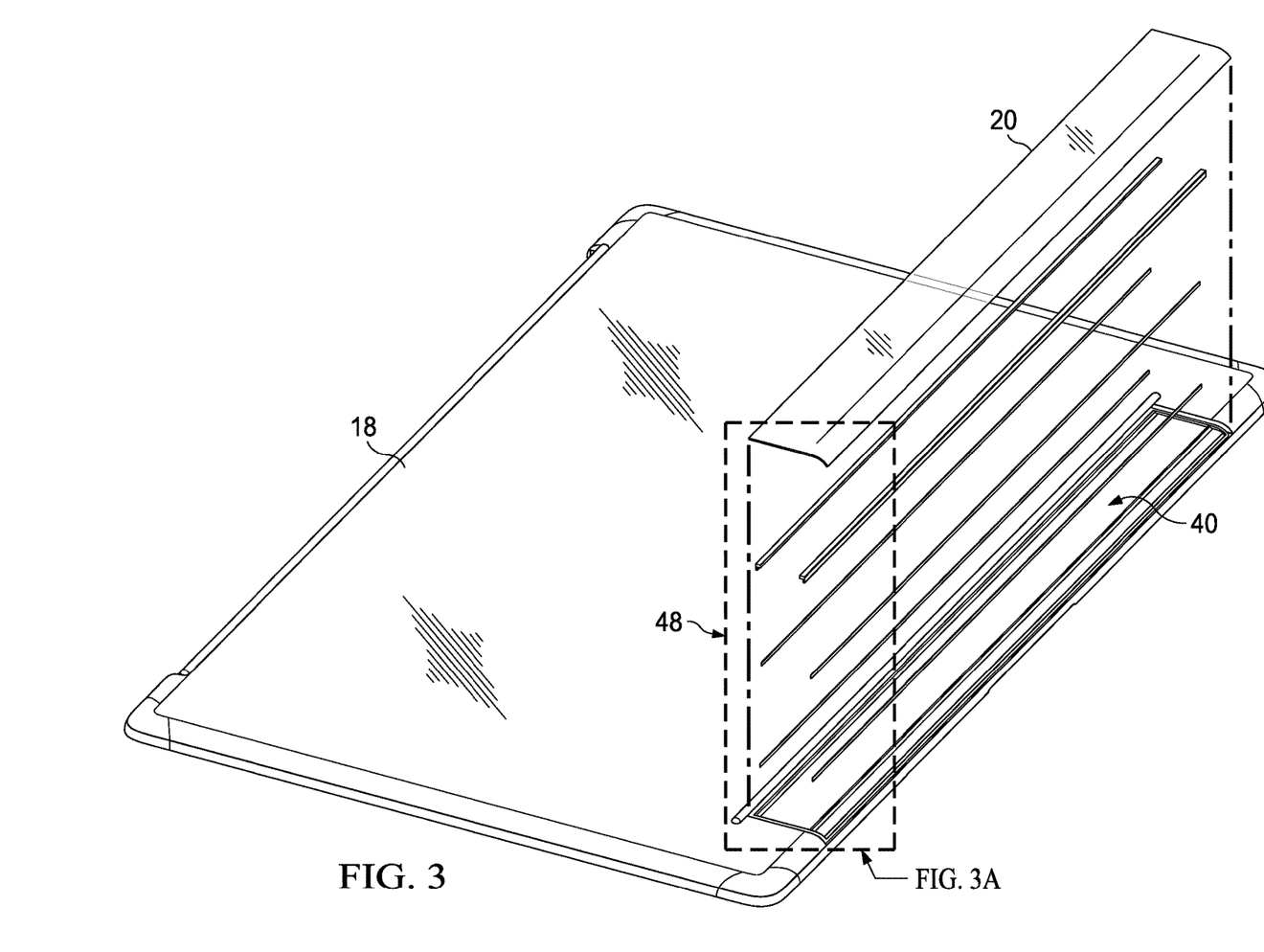
FIGS. 3 and 3A depict a bottom exploded perspective view of an example embodiment of audio elements disposed in a speaker chamber defined between a speaker housing section of a main housing portion and a speaker chamber cover.
Figure 3A:
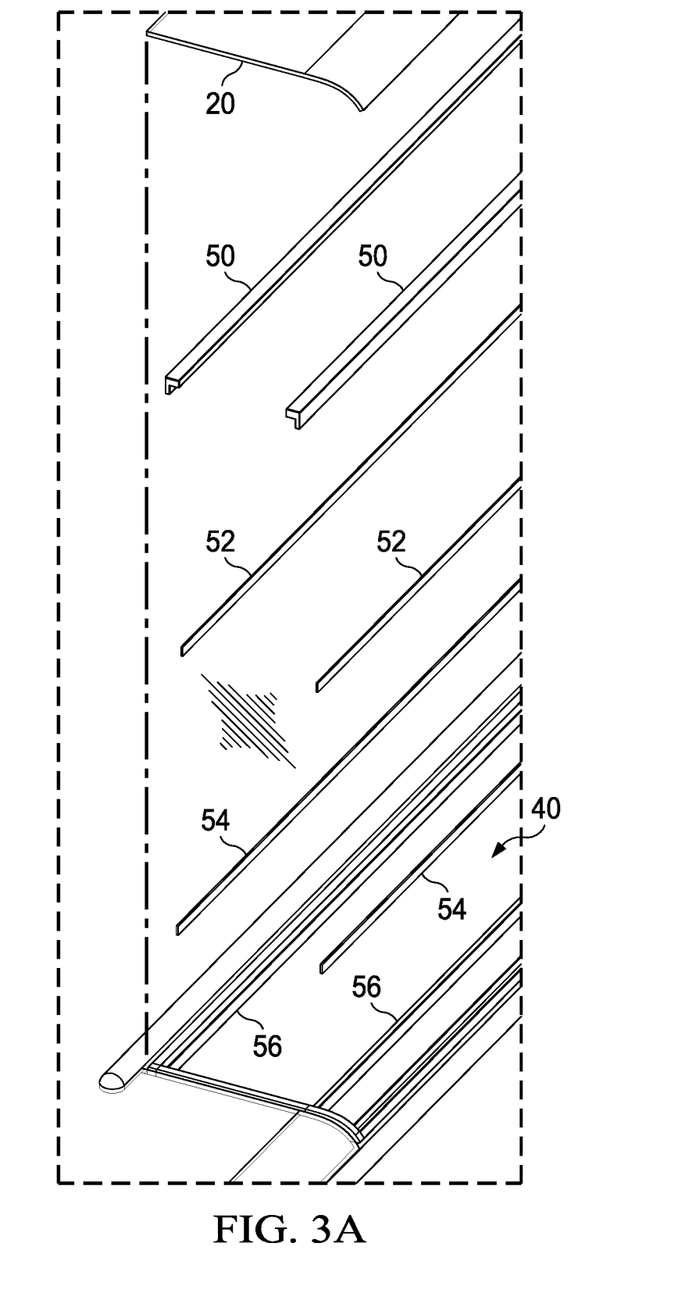

Referring now to FIGS. 3 and 3A, a bottom exploded perspective view depicts an example embodiment of audio elements 48 disposed in speaker chamber defined between a speaker housing section 20 of a main housing portion 18 and a speaker chamber cover 40. In the example embodiment, two audio elements 48 are disposed in the speaker chamber to generate sound. For example, one audio element may generate higher tones while another generates bass. Both audio elements extend along the width of the speaker chamber. In alternative embodiments plural audio elements may be included, such as a full length audio element for bass and a pair of shorter audio elements to each side of the speaker chamber that generate left and right stereo channels. FIG. 3A depicts audio elements 48 exploded to illustrate details of the example embodiment. Each audio element includes a coil beam 50 that couples with a liquid optically clear adhesive to a glass ceramic speaker housing section 20 and supports an audio coil 52 that receives audio signals from an audio chipset as an analog signal passed along the length of audio coil 52. A coil magnet 54 couples to a member 56 that extends down from speaker chamber cover 40 into the speaker chamber and parallel with audio coil 52. Interactions of audio signal current passing through audio coil 52 proximate with audio coil magnet 54 result in vibrations that generate audible sound. In various embodiments, the type and quality of the audible sound is managed by selection of the types of materials that couple audio coil 52 and audio magnet 54 in parallel relationship. For instance, different thicknesses of plastic and forms of support may be varied in different embodiments to optimize the audio response.

Figure 4:
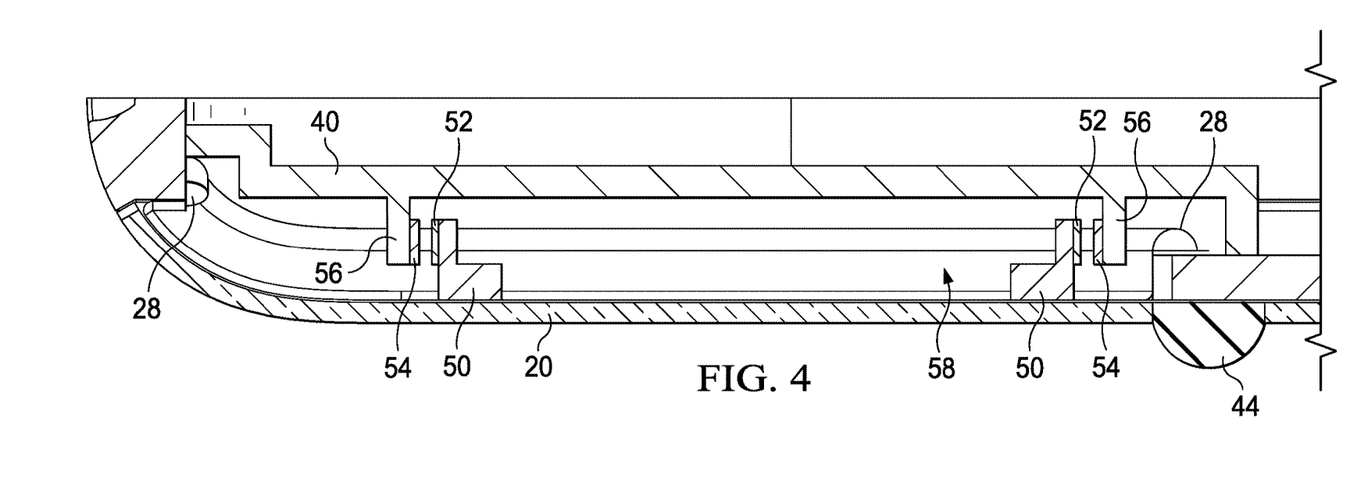
FIGS. 4, 4A and 4B depict a side sectional view of an example of a speaker chamber defined between a speaker chamber cover and speaker housing section.
Figure 4A:
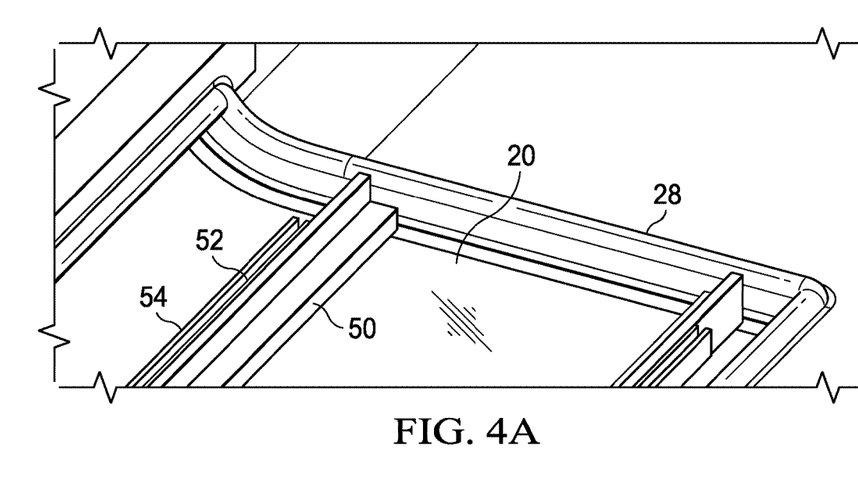
Figure 4B:
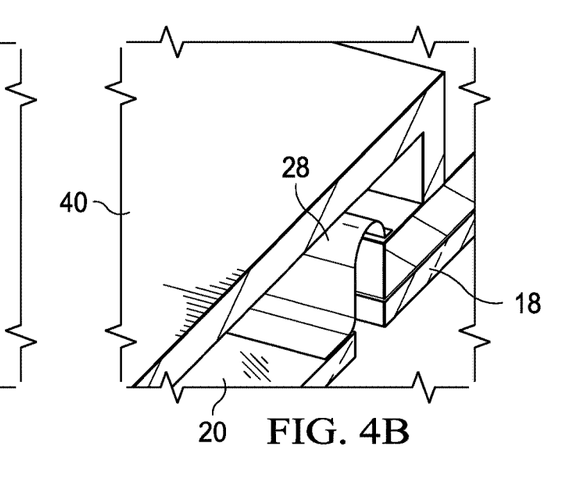

Referring now to FIGS. 4, 4A and 4B, a side sectional view depicts an example of a speaker chamber 58 defined between a speaker chamber cover 40 and speaker housing section 20. In the example embodiment, speaker housing section 20 has a thickness of 0.4 mm and the overall thickness of the assembly from the top side of speaker chamber cover 40 to the bottom of speaker housing section 20 is 3.5 mm. Members 56 extend down into speaker chamber 58 to hold audio magnet 54 in parallel alignment an audio coil 52 held by a coil beam 50 coupled to speaker housing section 20. A first audio element is disposed at a front position in speaker chamber 58 and a second audio element is disposed at a rear position of speaker chamber 58. Flexible elastic polymer material 46 is disposed as a gasket around the perimeter of speaker housing section 20 at its intersection with main housing portion 18 and housing cover 34. Foot 44 couples at a rear position of speaker chamber 58 to hold speaker housing section 20 above a support surface, thereby support free vibration to generate audio sounds. FIG. 4A depicts an upper perspective view of elastic polymer material 46 coupled to both main housing portion 18 and speaker housing section 20 to define the speaker chamber boundary under speaker chamber cover 40. FIG. 4B depicts an upper rear perspective view of speaker housing section 20 with audio coil 52 and audio coil beam 50 coupled to the glass ceramic material and aligned for assembly to main housing portion 18. Elastic polymer material 46 couples to the perimeter of speaker housing section 20 to form a gasket that supports vibration of speaker housing section 20 relative to main housing portion 18 for generating sound.

Figure 5:
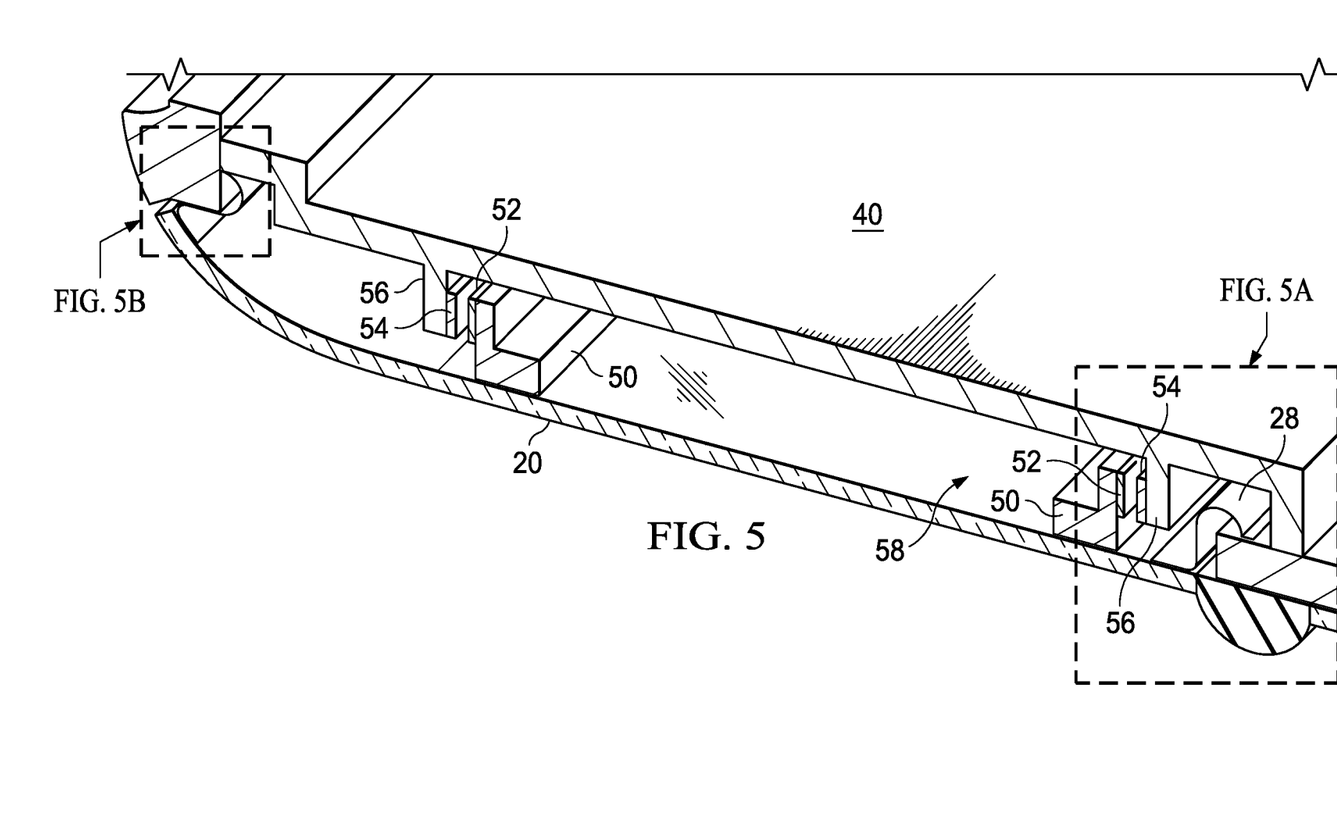
FIGS. 5, 5A and 5B depict a side sectional upper perspective view of an example of a speaker chamber integrated with a portable information handling system housing
Figure 5A:
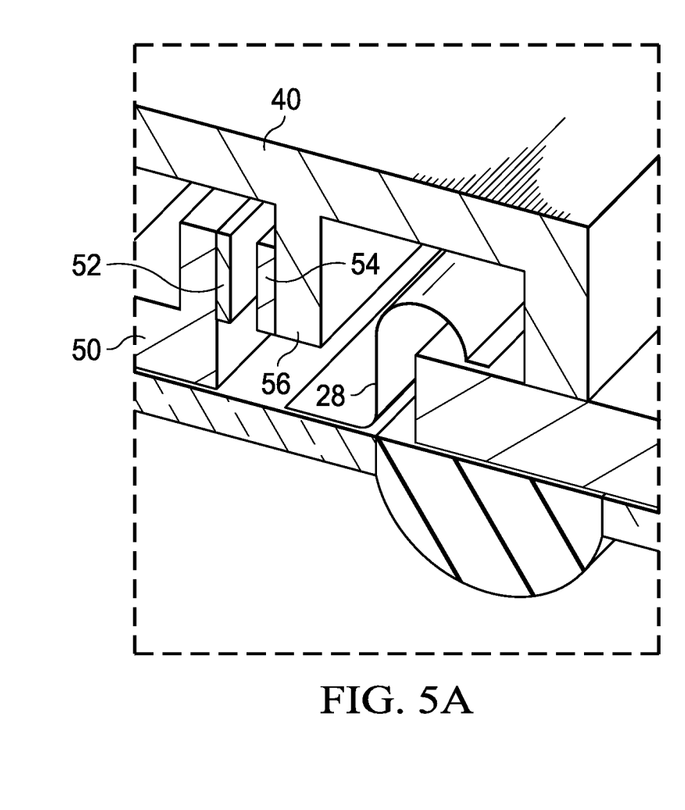
Figure 5B:
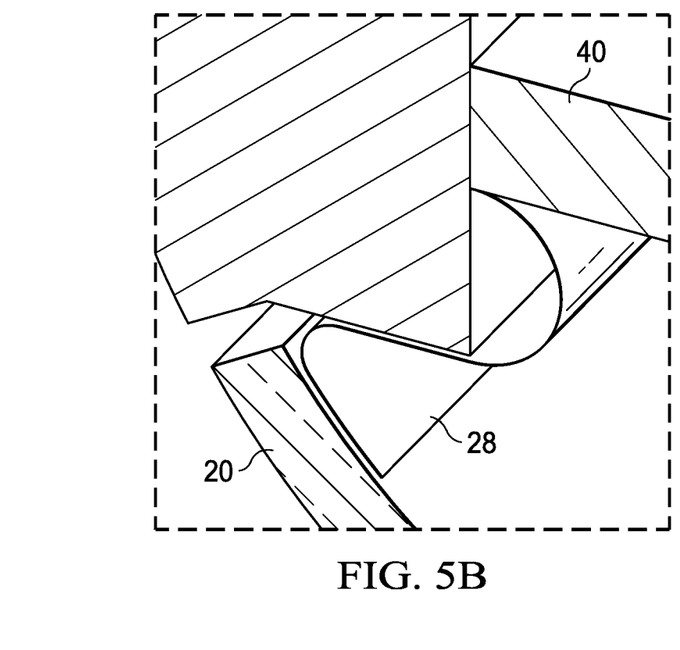

Referring now to FIGS. 5, 5A and 5B, a side sectional upper perspective view depicts an example of a speaker chamber 58 integrated within a portable information handling system housing. Speaker chamber cover 40 defines the upper side of speaker chamber 58 and couples to main housing portion 18, such as through the housing cover and internal structures. FIG. 5A depicts a close-up rear upper perspective view of the audio element having audio coil 52 aligned with audio magnet 54 so that audible vibration is generated by passing an analog audio signal through audio coil 52. In the example embodiment, audio coil beam 50 and speaker chamber cover member 56 hold audio coil 52 and audio magnet 54 is a horizontal alignment so that vibrations are generated along the plane of main housing portion 18. In an alternative embodiment, audio coil 52 and audio magnet 54 may be aligned in a vertical alignment, such as with audio magnet 54 over top of audio coil 52. In another alternative embodiment, the audio magnet may couple to the speaker housing section and the audio coil may couple to the speaker chamber cover. A silk screen or other treatment may paint the speaker housing section to conceal it relative to the speaker chamber cover. Elastic polymer material 46 couples speaker housing section 20 to main housing portion 18 at the rear side of speaker chamber 58. FIG. 5B depicts elastic polymer material 46 coupled between speaker housing section 20 and housing cover 34 to form the speaker diaphragm gasket at the front upper side of speaker chamber 58. By coupling elastic polymer material 46 under a lip formed by housing cover 34, the seam in at the front of speaker housing section 20 is hidden from end user sight.

Although the present invention has been described in detail, it should be understood that various changes, substitutions and alterations can be made hereto without departing from the spirit and scope of the invention as defined by the appended claims.

What is claimed is:

1. An information handling system comprising:
a housing having a length, a width and a depth, the housing having a separate speaker section at a bottom front surface along the width;
a processor disposed in the housing and operable to execute instructions to process information;
a memory disposed in the housing and interfaced with the processor, the memory operable to store the instructions and information;
an audio chipset disposed in the housing and interfaced with the processor, the audio chipset operable to process the information to generate audio signals that play as audible sounds at a speaker;
a speaker chamber cover coupled to the housing within an opening formed at the speaker section, the speaker section coupling over the speaker chamber cover to define a speaker chamber, the speaker section exposed as the housing outer surface;
a first coil magnet coupled to the speaker chamber cover along the housing width; and
a first speaker coil coupled to the speaker section along the width to align parallel with the first coil magnet when the speaker section couples to the housing, the first speaker coil interfaced with the audio chipset to receive the audio signals and covert the audio signals to audible sounds in cooperation with the first coil magnet and the speaker chamber.

2. The information handling system of claim 1 further comprising:
a second coil magnet coupled to the speaker chamber cover along the housing width; and
a second speaker coil coupled to the speaker section along the width to align parallel with the second coil magnet when the speaker section couples to the housing, the second speaker coil interfaced with the audio chipset to receive the audio signals and covert the audio signals to audible sounds in cooperation with the second coil magnet and the speaker chamber.

3. The information handling system of claim 2 wherein:
the housing and speaker section comprise a glass ceramic material; and
the first and second speaker coils couple to the speaker section with an optically clear adhesive.

4. The information handling system of claim 3 further comprising a flexible diaphragm disposed between the housing and speaker section.

5. The information handling system of claim 3 wherein the housing front side and speaker section having a curved surface to direct audible noise of the speaker chamber up from the front of the housing.

6. The information handling system of claim 4 wherein the speaker chamber cover comprises a plastic material having first and second extensions into the speaker, the first and second coil magnets.

7. The information handling system of claim 6 wherein each of the first and second speaker coils comprise a plastic support coupled to the speaker section.

8. The information handling system of claim 3 wherein the speaker section comprises a cut out from the housing.

9. The information handling system of claim 1 wherein:
the housing further comprises a main housing portion and a lid housing portion rotationally coupled by a hinge;
the main housing portion includes the processor, the memory and the speaker chamber with a keyboard coupled over the main housing portion; and
the lid housing portion integrates a display.

10. A method for generating audible sounds at an information handling system faults, the method comprising:
cutting a speaker section from a bottom front side of a glass housing to define a speaker opening;
coupling a speaker chamber cover within the speaker opening to define a speaker chamber;
coupling a speaker magnet to the speaker chamber cover within the speaker chamber;
coupling a speaker coil to the speaker section; and
coupling the speaker section to the housing over the speaker chamber to align the speaker coil and speaker magnet, the speaker section coupled at the cutting to act as the glass housing outer surface.

11. The method of claim 10 further comprising:
communicating an audio signal from a processing component in the glass housing to the speaker coil; and
generating audible sounds by interaction of the speaker coil and speaker magnet in the speaker chamber.

12. The method of claim 11 further comprising:
directing the audible sound upwards from the housing with a curved front side of the speaker section.

13. The method of claim 11 further comprising:
coupling the speaker section to the housing with a gap on each of opposing sides of the speaker section; and
disposing a polymer diaphragm between the speaker section and housing.

14. The method of claim 11 further comprising:
coupling a foot to the housing bottom aligned with the speaker section.

15. The method of claim 10 further comprising:
forming the speaker chamber cover with plastic to have a member that extends into the speaker chamber;
coupling the speaker magnet to the member; and
coupling the speaker coil to the speaker section with optically clear adhesive.

16. The method of claim 15 further comprising treating the speaker section to match a color of the speaker chamber cover.

17. A speaker comprising:
an information handling system housing having an opening at a bottom front side extending along at least half of a width of the information handling system housing;
a speaker chamber cover sized to fit in the opening;
a housing section sized to fit in the opening to enclose the speaker chamber cover and define a speaker chamber, the housing section coupling in the opening as an outer surface of the housing;
a speaker magnet coupled to the speaker chamber cover and extending along substantially the width of the opening and speaker chamber cover; and
a speaker coil coupled to the housing section to align with the speaker magnet when the housing section couples to the housing at the opening.

18. The speaker of claim 17 wherein the information handling system housing and the housing section comprise a glass ceramic material.

19. The speaker of claim 17 further comprising a polymer film disposed between the information handling system housing and the housing section.

20. The speaker of claim 17 further comprising:
plural speaker coils aligned with plural speaker magnets;
wherein each of the plural speaker coils is associated with an audio channel.

* * * * *